(12) United States Patent
Manderbacka

(10) Patent No.: US 10,527,318 B2
(45) Date of Patent: Jan. 7, 2020

(54) COLLECTOR ELEMENT FOR COLLECTING SOLAR ENERGY

(71) Applicant: Double M Properties Ab, Kokkola (FI)

(72) Inventor: Mats Manderbacka, Kokkola (FI)

(73) Assignee: Double M Properties Ab, Kokkola (FI)

( * ) Notice: Subject to any disclaimer, the term of this patent is extended or adjusted under 35 U.S.C. 154(b) by 0 days.

(21) Appl. No.: 15/429,449

(22) Filed: Feb. 10, 2017

(65) Prior Publication Data

US 2018/0231275 A1  Aug. 16, 2018

(51) Int. Cl.
  *E04D 13/18* (2018.01)
  *F24S 20/67* (2018.01)
  *F24S 20/25* (2018.01)

(52) U.S. Cl.
  CPC .............. *F24S 20/67* (2018.05); *F24S 20/25* (2018.05)

(58) Field of Classification Search
  CPC ........................................ F24J 2/045
  USPC ................... 126/621, 661, 628, 652
  See application file for complete search history.

(56) References Cited

U.S. PATENT DOCUMENTS

| | | | | | |
|---|---|---|---|---|---|
| 4,092,979 | A | * | 6/1978 | Kotlarz | .................... F24S 23/31 |
| | | | | | 126/628 |
| 4,465,058 | A | * | 8/1984 | Reick | ...................... F24S 20/66 |
| | | | | | 126/628 |
| 5,022,381 | A | * | 6/1991 | Allegro | .................. F24J 2/0455 |
| | | | | | 126/622 |
| 8,910,624 | B2 | | 12/2014 | Manderbacka | |

\* cited by examiner

*Primary Examiner* — Avinash A Savani
(74) *Attorney, Agent, or Firm* — Sughrue Mion, PLLC

(57) ABSTRACT

A collector element for collecting solar energy. The collector element is made of metal and comprises at least one elongated central ridge comprising at least one internal flow channel for a heat transfer medium, first and second elongated side ridges at opposite sides of the at least one central ridge and an elongated depression between each two adjacent ridges. At least one side ridge comprises at least one fastening element by means of which at least one substantially solar radiation permeable covering element is to be fastened to the collector element for covering at least the at least one elongated central ridge of the collector element.

9 Claims, 5 Drawing Sheets

COLLECTOR ELEMENT FOR COLLECTING SOLAR ENERGY

FIELD OF THE INVENTION

The present invention relates to solar energy and especially to a collector element to be used in the solar collector.

BACKGROUND OF THE INVENTION

U.S. Pat. No. 8,910,624 B2 discloses a solar collector comprising a collector element plane comprising a set of parallel metallic collector elements for collecting solar energy. The collector elements are metallic profile elements and they comprise elongated side ridges and an elongated central ridge remaining between the elongated side ridges. Elongated depressions remain between the ridges of the collector element. The elongated central ridge further comprises therein a channel for a heat transfer medium.

BRIEF DESCRIPTION OF THE INVENTION

An object of the present invention is to provide a novel collector element for collecting solar energy.

The invention is characterized by the features of the independent claims.

The invention is based on the idea of including to the collector element also at least one fastening element so that at least one substantially solar radiation permeable covering element can be fastened to the collector element for covering at least the at least one elongated central ridge of the collector element.

The advantage of the invention is that the covering element may be fastened in place without using any screws or bolts or other fastening means that would penetrate through the covering element. The fastening of the covering element to the collector elements is thus fast and easy to make watertight.

Some embodiments of the invention are disclosed in the dependent claims.

BRIEF DESCRIPTION OF THE DRAWINGS

In the following the invention will be described in greater detail by means of preferred embodiments with reference to the accompanying drawings, in which.

For the sake of clarity, the figures show some embodiments of the invention in a simplified manner. Like reference numerals identify like elements in the figures.

DETAILED DESCRIPTION OF THE INVENTION

Figure 1:
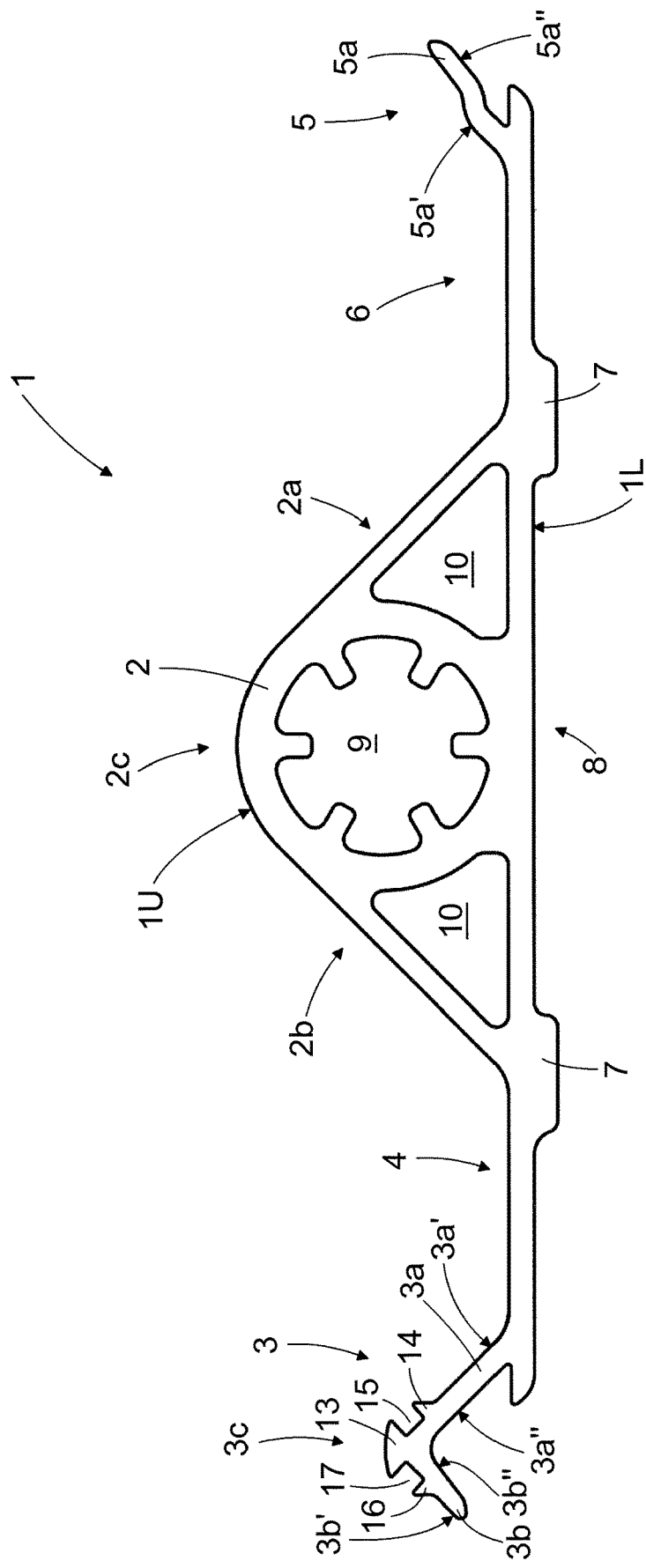
FIG. 1 shows schematically an end view of a collector element.
Figure 2:
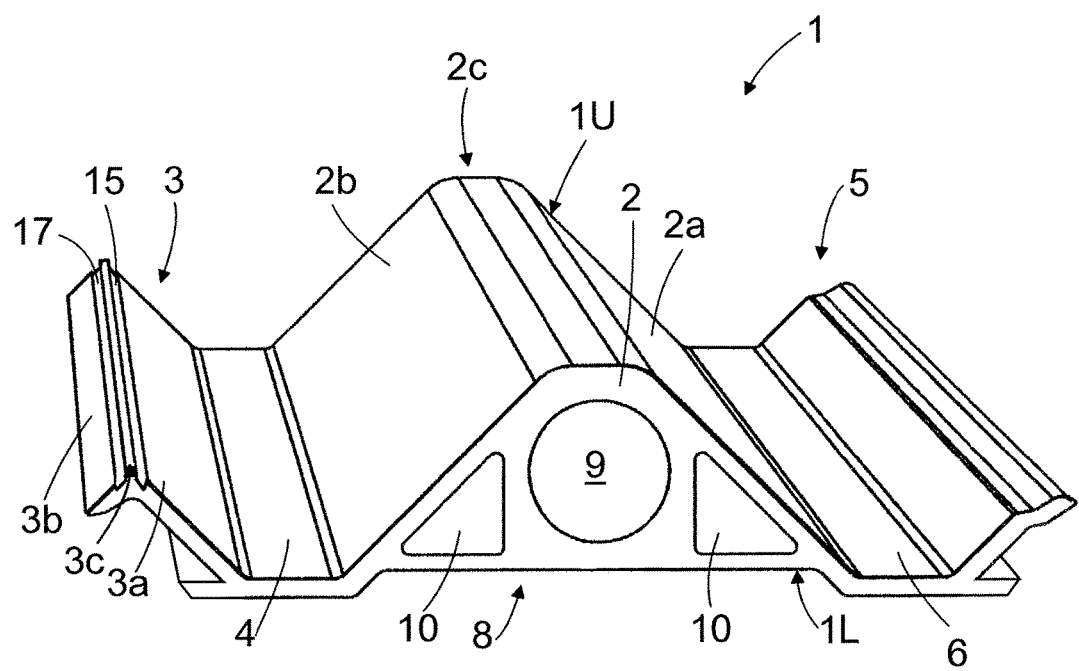
FIG. 2 shows schematically a three-dimensional view of another collector element.

FIG. 1 shows schematically an end view of a collector element 1 and FIG. 2 shows schematically a three-dimensional view of another collector element 1. The collector element 1 is an elongated metallic profile element. The collector element 1 comprises an upper surface 1U or an upper side 1U that is the side of the collector element 1 to be arranged to face the sun. Further the collector element 1 comprises a lower surface 1L or a lower side 1L that is the side of the collector element 1 to be arranged to face away from the sun, i.e. to face towards a structure where the collector element 1 is intended to be fastened to.

The collector element 1 may for example be made of aluminum or aluminum alloy. The advantage then is, inter alia, good thermal ability to absorb or receive heat and conduct heat, as well as a good applicability to the manufacture of collector elements by an extrusion process. Owing to the aluminum material, the collector elements are also strong, whereby a solar collector formed of a set of adjacently assembled collector elements 1, as shown later, is also highly suitable for forming at least a part of a roof of a building.

The collector element 1 comprises an elongated central ridge 2. The central ridge 2 extends substantially from one end of the collector element 1 up to the opposite end of the collector element 1. The central ridge 2 has a first flank 2a, a second flank 2b and a peak portion 2c between the first flank 2a and the second flank 2b.

The collector element 1 further comprises an elongated first side ridge 3. The first side ridge 3 extends substantially from one end of the collector element 1 up to the opposite end of the collector element 1 and is substantially parallel to the central ridge 2. The first side ridge 3 forms a first side edge of the collector element 1, i.e. a left-hand side edge of the collector element 1 as seen in FIGS. 1 and 2. The first side ridge 3 comprises a first flank 3a remaining on the side of the first side ridge 3 facing towards the central ridge 2, the first flank 3a thus facing towards the central ridge 2. The first flank 3a has an upper surface 3a' on the side of the upper surface 1U of the collector element 1 and a lower surface 3a" on the side of the lower surface 1L of the collector element 1. The first side ridge 3 comprises a second flank 3b remaining on the side of the first side ridge 3 facing away from the central ridge 2, the second flank 3b thus facing towards the central ridge 2. The second flank 3b has an upper surface 3b' on the side of the upper surface 1U of the collector element 1 and a lower surface 3b" on the side of the lower surface 1L of the collector element 1. At a top of the first side ridge 3 between the first flank 3a and the second flank 3b there is a peak portion 3c of the first side ridge 3. Between the central ridge 2 and the first side ridge 3 there is an elongated depression 4 that substantially extends from one end of the collector element 1 up to the opposite end of the collector element 1.

The collector element 1 comprises also an elongated second side ridge 5. The second side ridge 5 extends substantially from one end of the collector element 1 up to the opposite end of the collector element 1 and is substantially parallel to the central ridge 2. The second side ridge 5 forms a second side edge of the collector element 1, i.e. a right-hand side edge of the collector element 1 as seen in FIGS. 1 and 2. The second side ridge 5 comprises a flank 5a remaining on the side of the second side ridge 5 facing towards the central ridge 2, the flank 5a thus facing towards the central ridge 2. The flank 5a has an upper surface 5a' on the side of the upper surface 1U of the collector element 1 and a lower surface 5a" on the side of the lower surface 1L of the collector element 1. At an external end of the flank 5a there is a peak portion 5b of the flank 5a. Between the central ridge 2 and the second side ridge 5 there is an elongated depression 6 that substantially extends from one end of the collector element 1 up to the opposite end of the collector element 1.

The collector element 1 of FIG. 1 further comprises at the lower side 1L thereof, at points where the flanks 2a, 2b of the central ridge 2 and the depressions 4, 6 remaining between the side ridges 3, 5 and the central ridge 2 meet, projecting parts 7 that extend away the lower surface 1L of the collector element 1. The projecting parts 7 provide support elements through which the collector element 1 may become supported to the structure where the collector element 1 is intended to be fastened to. This also provides a free space 8 between the projecting elements 7 below the central ridge 2.

In the collector element 1 of FIG. 2 a corresponding free space 8 is provided by dimensioning the central ridge 2 and the depressions 4, 6 lying next to the central ridge 2 relative to each other in such a way that the lower surface 1L of the collector element 1 is dimensioned to extend lower at the depressions 4, 6 than at the central ridge 2.

In the embodiments of the collector element 1 of FIGS. 1 and 2 there is only one central ridge 2 remaining between the side ridges 3, 5 but a single collector element 1 may also comprise two or more central ridges 2 between the side ridges 3, 5.

The central ridge 2 further comprises an internal tubular flow channel 9 for a heat transfer medium. The heat transfer medium is intended to transfer the heat received or absorbed by the collector element 1 and conducted through the collector element 1 to the heat transfer medium and with the heat transfer medium away from the collector element 1 to the intended use.

The upper surface 1U of the collector element 1, as especially the upper surface 1U of the collector element 1 at the central ridge 2 of the collector element 1 receives or absorbs the solar radiation and becomes heated by it. The heat conducts in the material of the collector element 1 to the heat transfer medium flowing in the flow channel 9, thus heating the heat transfer medium flowing in the flow channel 9. The at least one central ridge 2 ensures that the at least some portion of the upper surface 1U of the collector element 1 is always aligned substantially perpendicularly to the sun, whereby the solar radiation is received effectively and a reflection of the solar radiation away from the collector element 1 is minimized.

In the embodiment of the collector element 1 of FIG. 2 a cross sectional shape of the flow channel 9 is round whereas in the embodiment of the collector element 1 of FIG. 1 a cross sectional shape of the flow channel 9 comprises recesses 10 extending into the material of the collector element 1 at the central ridge 2. The cross sectional shape of the flow channel 9 in FIG. 1 has a larger cross sectional area when compared to the cross sectional shape of the flow channel 9 in FIG. 2. This provides in the embodiment of FIG. 1 a larger contacting area between the heat transfer medium and the collector element 1 than in the embodiment of FIG. 2, whereby heat absorbed to the collector element 1 transfers from the collector element 1 to the heat transfer medium more efficiently in the embodiment of FIG. 1 than in the embodiment of FIG. 2.

The central ridge 2 may further comprise internal free spaces 4 next to the flanks 2a, 2b, i.e. between each of the flank 2a, 2b and the flow channel 9 for the heat transfer medium. The free spaces 4 are preferably tubular spaces extending from one end of the collector element 1 up to the opposite end of the collector element 1. The spaces 10 enable the size of the central ridge 2 to be increased without increasing the use of material. When the collector element 1 is taken in use, the ends of the internal spaces 10 are closed with suitable closure elements, whereby air ventilation through the internal spaces is low if any.

The spaces 10 increase a rigidity of the collector element 1. The spaces 10 provides also at least some control for the heat conduction flow inside the central ridge 2, at least partly directing the heat conduction towards the flow channel 9 because of preventing the heat conduction through the free spaces 10. The air gap provided between the collector element 1 and the structure where the collector element 1 is intended to be fastened to by the free space 8 below the central ridge 2 also prevents the heat escape through the lower surface 1L of the collector element 1 to the structure where the collector element 1 is intended to be fastened to, whereby more heat energy will conduct into the flow channel 9 and the heat transfer medium flowing therein.

Figure 3:
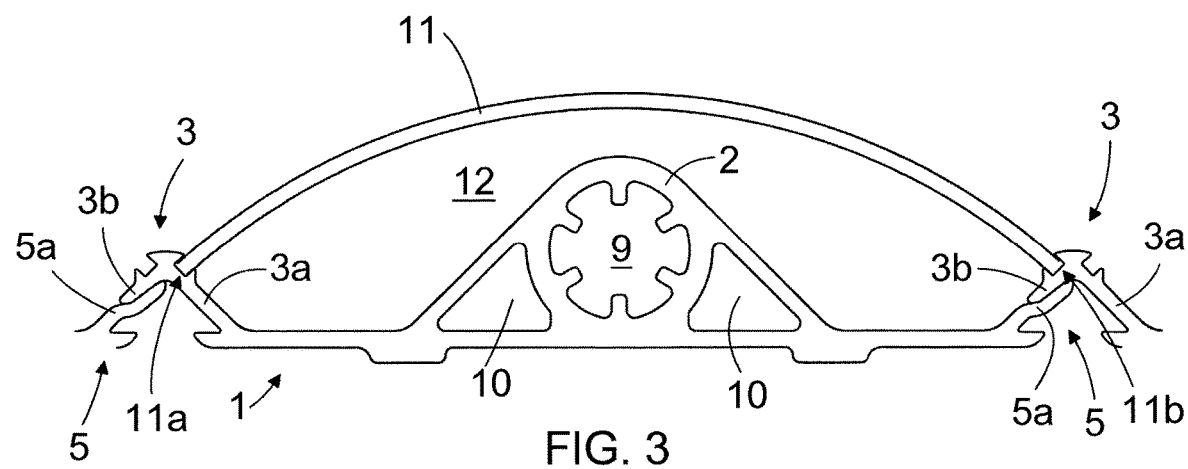
FIG. 3 shows schematically an end view of the collector element of FIG. 1 provided with a substantially solar radiation permeable covering element.
Figure 4:
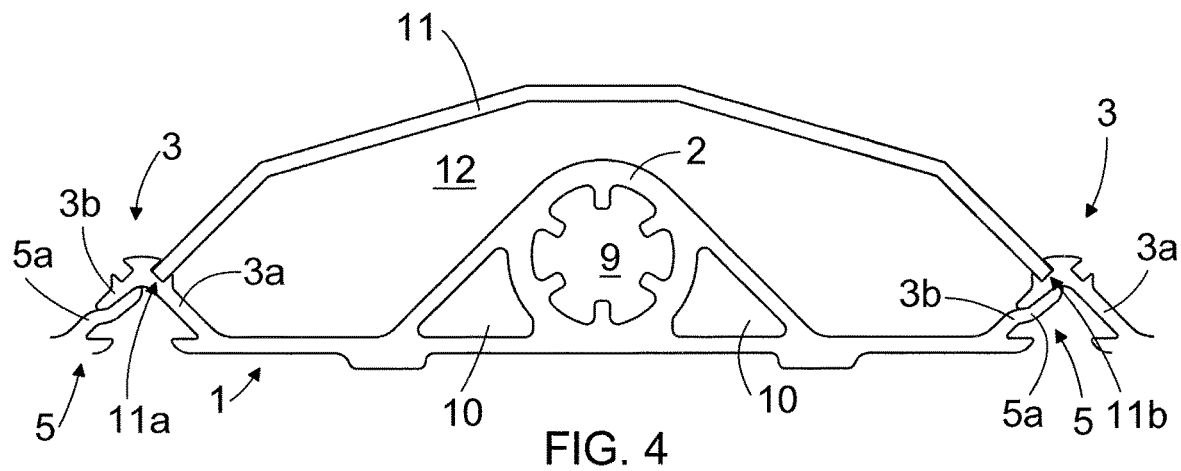
FIG. 4 shows schematically an end view of the collector element of FIG. 1 provided with another substantially solar radiation permeable covering element.

When a solar collector comprising a set of adjacent collector elements 1 is assembled, the adjacent collector elements 1 are supported against one another substantially without any gap therebetween. The way of this support can be seen for example in FIGS. 3 and 4. FIGS. 3 and 4 show schematically an end view of a single complete collector element 1. On the right hand side of the single complete collector element 1 there is further shown a first side ridge 3 of a second collector element 1 and on the left hand side of the single complete collector element 1 there is shown a second side ridge 5 of a third collector element 1. The adjacent collector elements 1 are supported against one another in such a way that the second flank 3b of the first side ridge 3 in one collector element 1 is laid on top of the flank 5a of the second side ridge 5 in the neighbouring collector element 1, whereby a lower surface 3a" of the second flank 3b of the first side ridge 3 in the one collector element 1 is supported against an upper surface 5a' of the flank 5a of the second side ridge 5 in the neighbouring collector element 1. The adjacent collector elements 1 are thus supported to each other without any gap therebetween.

FIGS. 3 and 4 disclose also a substantially solar radiation permeable covering element 11, which is an elongated covering element 11, which is arranged to extend from one end of the collector element 1 up to the opposite end of the collector element 1. The transversal cross section of the covering element 11 has a convex shape and it has a first side edge 11a and a second side edge 11b. The covering element 11 is arranged above the collector element 1 in connection with the collector element 1 in such a way that convex surface of the covering element 11 faces upwards, i.e. to the sun, whereby an open space 12 remains between the upper side 1U of the collector element 1 and the covering element 11. This open space 11 is thus filled with air, whereby the open space 11 provides an insulation between the upper side 1U of the collector element 11 and the outer surroundings of the collector element 11, thereby preventing heat absorbed by the collector element 1 to escape from the collector element 1 to the surroundings thereof.

The substantially solar radiation permeable covering element 10 is intended to protect the collector element 1 and the upper surface thereof, as well as a seam between two adjacent collector elements 1, against for example the rain or leaves but at the same time allow the solar radiation to pass through the covering element 10 and to reach the upper surface 1U of the collector element 1. The covering element 11 may be made of for example clear or coloured glass or plastic, such as polycarbonate. An inner surface of the covering element 10 may be covered with a material layer reflecting any possible solar radiation reflected from the upper surface 1U of the collector element 1 back towards the collector element 1, the said material layer, however, allowing the solar radiation from the sun to penetrate the material layer and to end up to the upper surface 1U of the collector element 1. In the embodiment of FIG. 3 the cross section of the convex cover element 11 is continuously curved comprising a single curved portion whereas in the embodiment of FIG. 4 the cross section of the convex cover element 11 is piecewise continuous comprising a number of interconnected straight portions having angles of varying magnitudes therebetween.

Referring back to the embodiment of FIGS. 1, 3 and 4, the first side ridge 3 of the collector element 1 comprises a number of elongated protrusions extending substantially from one end of the collector element 1 up to the other end of the collector element 1, which protrusions form therebetween a number of grooves that provide fastening elements for fastening the cover element 11 in connection with the collector element 1.

Therefore the first side ridge 3 in the collector element 1 comprises at the peak portion 3c thereof a first elongated protrusion 13 extending along the peak portion 3c of the first side ridge 3 and protruding upwards, i.e. to the direction where the upper side 1U of the collector element 1 faces to.

Furthermore, the upper surface 3a' of the first flank 3a of the first side ridge 3 comprises at a distance from the peak portion 3c a second elongated protrusion 14 extending along the first flank 3a and protruding away from the first flank 3a, i.e. to the direction where the upper surface 3a' of the first flank 3a of the first side ridge 3 faces to. The first elongated protrusion 13 at the peak portion 3c of the first side ridge 3 and the second elongated protrusion 14 at the first flank 3a of the first side ridge 3 define an elongated first fastening groove 15 extending along the first flank 3a of the first side ridge 3 for receiving a first side edge 11 of the covering element 11, as shown in FIGS. 3 and 4.

Furthermore, the upper surface 3b' of the second flank 3b of the first side ridge 3 comprises at a distance from the peak portion 3c a third elongated protrusion 16 extending along the second flank 3b and protruding away from the second flank 3b, i.e. to the direction where the upper surface 3b' of the second flank 3b of the first side ridge 3 faces to. The first elongated protrusion 13 at the peak portion 3c of the first side ridge 3 and the third elongated protrusion 16 at the second flank 3b of the first side ridge 3 define an elongated second fastening groove 17 extending along the second flank 3b of the first side ridge 3 for receiving a second side edge 11b of the covering element 11, as shown in FIGS. 3 and 4.

In the embodiment of FIG. 1, the first flank 3a of the first side ridge 3 of the collector element 1 thus comprises a first fastening groove 15 extending along the first flank 3a of the first side ridge 3 substantially parallel to the first side ridge 3 and the second flank 3b of the first side ridge 3 of the collector element 1 comprises a second fastening groove 17 extending along the second flank 3b of the first side ridge 3 substantially parallel to the first side ridge 3. Thereby the substantially solar radiation permeable covering element 11 is to be fastened in connection with the collector element 1 in such a way that the first side edge 11a of the covering element 11 is received by the first fastening groove 15 in the first flank 3a of the first side ridge 3 in one collector element 1 and the second side edge 11b of the covering element 11 is received by the second fastening groove 17 in the second flank 3b of the first side ridge 3 in the adjacent collector element 1, as shown in FIGS. 3 and 4. In other words, the covering element 11 is fastened between the first fastening groove 15 in the first flank 3a of the first side ridge 3 in one collector element 1 and the second fastening groove 17 in the second flank 3b of the first side ridge 3 in the adjacent collector element 1, as shown in FIGS. 3 and 4.

When the first side edge 11a and the second side edge 11b of the covering element 11 are inserted into the corresponding first 15 and second 17 fastening grooves as disclosed, the covering element 11 firmly fastened to the adjacent collector elements 1. By dimensioning the thickness of the first 11a and the second 11b edges of the covering element 11 and the width of the first 15 and second 17 fastening grooves relative to each other that there is no clearance at all in the connection between them, the connection between the covering element 11 and the adjacent collector elements 1 to which the covering element 11 is fastened to, is watertight. Alternatively or in addition to also additional sealing elements or sealing material may be used in the connection between the covering element 11 and the collector elements 1. The length of the covering element 11 is preferably substantially the same as the length of the collector element 1.

The embodiment of the collector element 1 of FIG. 2 discloses also the first fastening groove 15 extending along the first flank 3a of the first side ridge 3 substantially parallel to the first side ridge 3 and the second fastening groove 17 extending along the second flank 3b of the first side ridge 3 substantially parallel to the first side ridge 3. The first fastening groove 15 and the second fastening groove 17 are provided in the upper surfaces 3a', 3b' of the first 3a and the second 3b flanks of the first side ridge 3 by leaving material out of the upper surfaces 3a', 3b' of the first 3a and the second 3b flanks of the first side ridge 3. In the embodiment of FIG. 2 there is thus not any specific protrusions in the first side ridge 3 as in the embodiment of FIG. 1.

If the first fastening groove 15 is dimensioned to be very deep and if the structure of the covering element 11 is dimensioned to be very rigid, the covering element 11 may be fastened in place only by arranging the first side edge 11a of the covering element 11 into the first fastening groove 15. In that embodiment there is not any second fastening groove 17 in the second flank 3b of the first side ridge 3 of the collector element 1.

The collector element as described thus comprises fastening elements for fastening the covering element 11 in place without using any screws or bolts or other fastening means that would penetrate through the covering element 1 or the use of which fastening means would require use of tools. The fastening of the covering element 11 to the collector elements 1 is thus fast and easy to make watertight. Similarly, if it is necessary for example due to a breakage to replace the covering element 11, it is easy to detach the previous covering element 11 from the collector elements 11.

Figure 5:
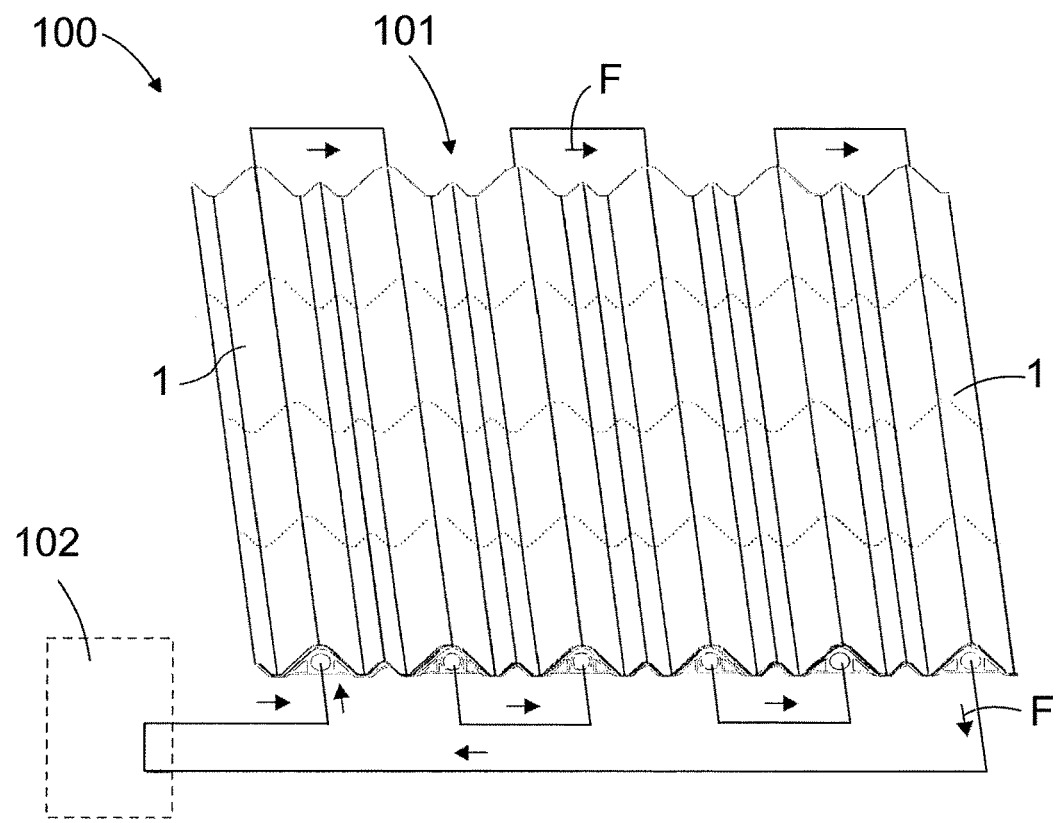
FIG. 5 shows schematically a solar recovery system.

FIG. 5 shows schematically a solar recovery system 100 where the collector elements 1 may be utilized. The solar recovery system 100 of FIG. 5 comprises a solar collector 101 formed of a set of parallel collector elements 1 and means for conveying the heat transfer medium via heat transfer medium flow channels 9 in the collector elements 1. For the sake of clarity the substantially solar radiation permeable covering elements 11 are not shown in FIG. 5. The means for conveying the heat transfer medium may comprise inter alia a pipework connected to the heat transfer medium flow channels 9, as schematically shown in FIG. 5, and possibly a pump or the like (not shown) for moving the heat transfer medium as is known in the direction shown by arrows F. Preferably, the solar energy recovery system 100 further comprises means 102 for removing heat off the heat transfer medium, the means 102 preferably comprising means for transferring heat to where the heat is to be used or to a heat reservoir. The heat reservoir may be in the form of an underground heat storage field. The heat may be used in a household water heating system, for instance. In such a case, in the embodiment shown in FIG. 5 the means 102 for removing heat off the heat transfer medium may comprise a water reservoir via which (e.g. through the water contained therein) the pipework carrying therein the heat transfer medium runs. In FIG. 5, the collector elements 1 of the system 100 are shown connected in series, as far as the flow of the heat transfer medium is concerned but, alternatively, the collector elements 1 of the system 100 could be connected in parallel, as far as the flow of the heat transfer medium is concerned.

Figure 6:
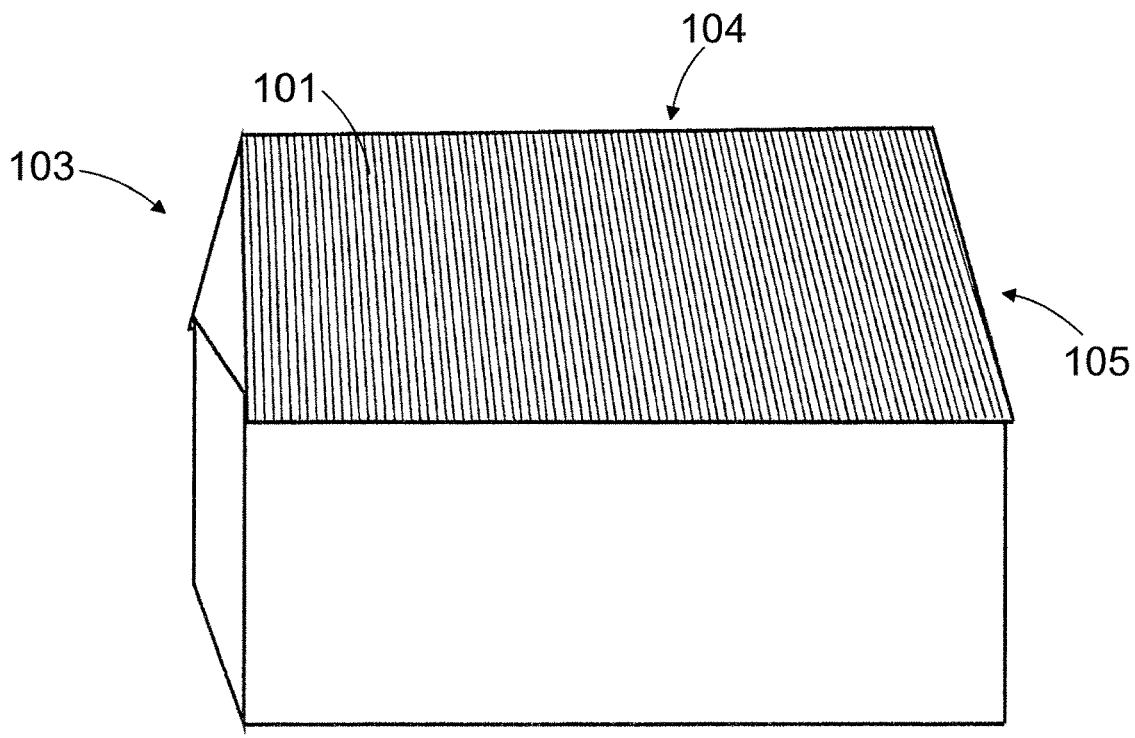
FIG. 6 shows schematically a building provided with a solar collector.

The solar collector 101 of FIG. 5 may be applied to provide at least part of a roof 104 of a building 103 as shown in FIG. 6, wherein the solar collector 101 is arranged to provide a pane 105 of the roof 104, whereby the collector elements 1 may be fastened to roof trusses or to roof battens fastened to the roof trusses of the roof 104. Because of the gapless connection between the adjacent collector elements 1 and because of the covering elements 11 protecting the collector elements 1 and the seams between the adjacent collector elements 1 the solar collector 101 of a set of parallel collector elements 1 provides a watertight structure. Furthermore, because the collector elements 1 are profile elements as disclosed, they are able to carry some load, for example snow load during winters, when the collector elements 1 are supported to roof trusses or to roof battens.

The collector elements 1 may be fastened to the roof 104 of the building 103 in a direction of the ridge of the roof 104 or in a direction of the pane 105 of the roof 104. A length of the collector element 1 may be some meters, for example 2-3 metres, whereby a number of collector elements 101 are interconnected so as to provide a structure that extends from one end of the pane 105 of the roof 104 up to the other end of the pane 105 of the roof 104 either in a longitudinal or transversal direction of the pane 105 of the roof 104. Alternative the collector elements 1 may be implemented so long that a single collector elements 1 may extend from one end of the pane 105 of the roof 104 up to the other end of the pane 105 of the roof 104 either in the longitudinal or transversal direction of the pane 105 of the roof 104.

Figure 7:
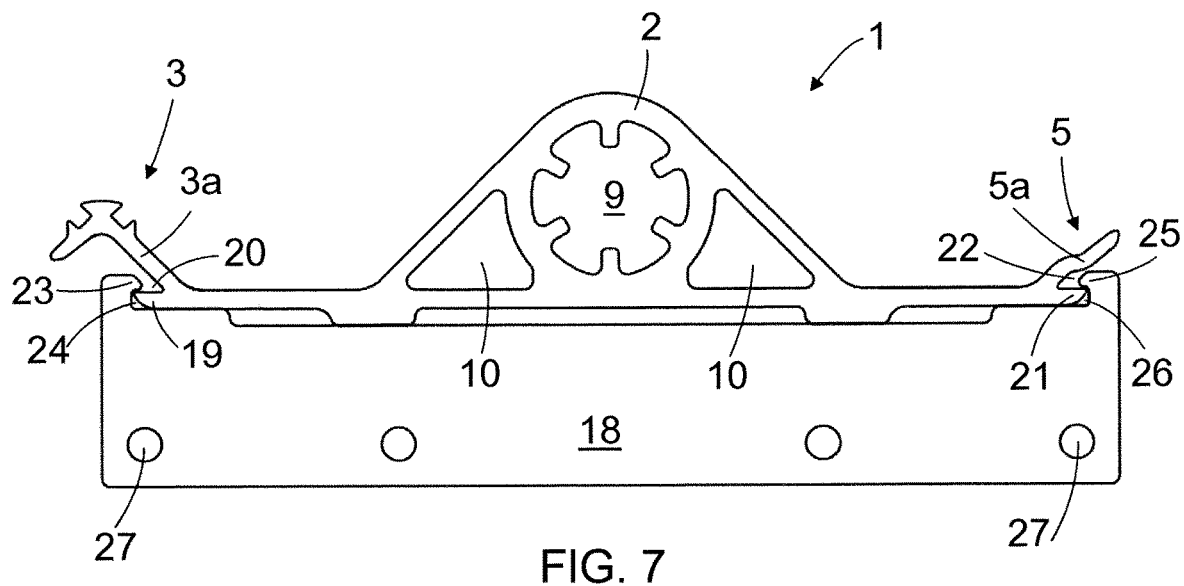
FIG. 7 shows schematically a fastener and a fastening arrangement for fastening a collector element to its intended place of use.

FIG. 7 shows schematically a fastener 18 for fastening the collector element 1 to its intended place of use at the ends of the collector element 1 as well as in the middle part of the collector element 1. The fastener 18 is a plate-like element made for example of metal. For fastening the collector element 1 to its intended place of use by the fastener 18 the collector element 1 comprises in the lower side 1L thereof a first projecting element 19 extending below the first flank 3a of the first side ridge 3 whereby a first pocket 20 is arranged to form between the first projecting element 19 and the first flank 3a of the first side ridge 3. Furthermore the collector element 1 comprises a second projecting element 21 extending below the flank 5a of the second side ridge 5, whereby a second pocket 22 is arranged to form between the second projecting element 21 and the flank 5a of the second side ridge 5. The fastener 18, in turn, comprises a first projecting element 23 extending into the first pocket 20 in the collector element 1 and a first pocket 24 for receiving the first projecting element 19 in the collector element 1, as well as a second projecting element 25 extending into the second pocket 22 in the collector element 1 and a second pocket 26 for receiving the second projecting element 21 in the collector element 1. The fastener 18 may be slid into its place in the collector element 1 through the end of the collector element 1. The fastener 18 may be fastened to roof trusses or to roof battens for example by screws extending through apertures 27 in the fastener 18.

Figure 8:
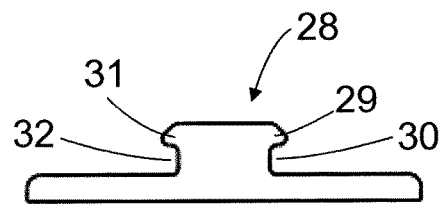
FIG. 8 shown schematically a second fastener for fastening a collector element to its intended place of use.
Figure 9:
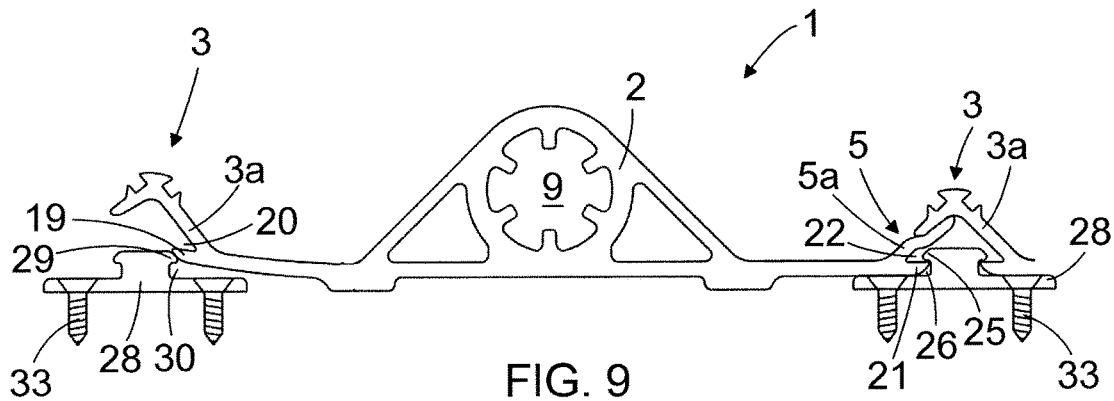
FIGS. 9 and 10 show schematically a fastening arrangement for fastening the collector element to its intended place of use by using the second fasteners.
Figure 10:
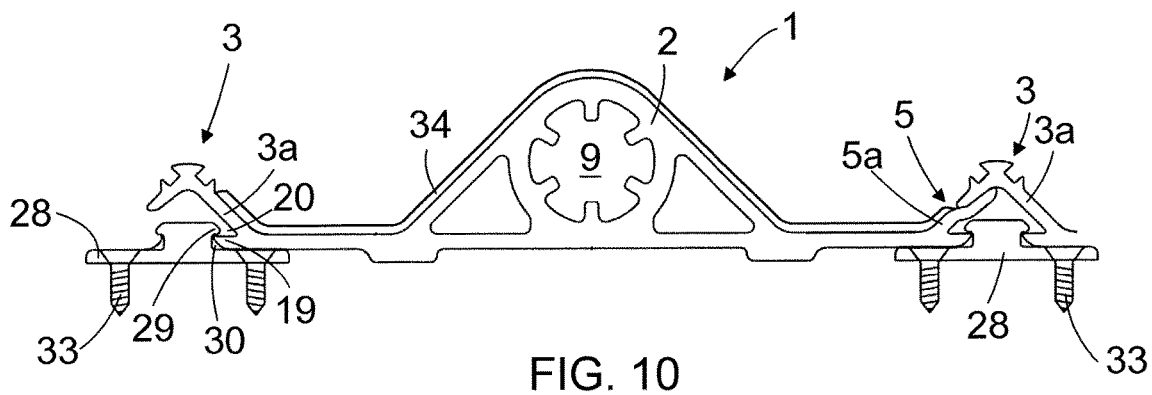

FIG. 8 shows schematically a second fastener 28 for fastening collector elements 1 to their intended place of use. The fastener 28 comprises a first projecting element 29 extending into the first pocket 20 in one collector element 1 and a first pocket 30 for receiving the first projecting element 19 in the same first collector element 1, as well as a second projecting element 31 extending into the second pocket 22 in the adjacent collector element 1 and a second pocket 32 for receiving the second projecting element 21 of the same adjacent collector element 1. The fastener 28 may be fastened to roof trusses or to roof battens for example by screws 33 as shown in FIGS. 9 and 10. The single fastener 28 may extend uniformly from one end of the collector element 1 up to the second end of the collector element 1. Alternatively two or more separate fasteners 28 may be applied in the longitudinal extension of the collector element 1.

FIGS. 9 and 10 show schematically a fastening arrangement for fastening the collector element 1 to its intended place of use by using the second fasteners 28. The fastening arrangement comprises second fasteners 28 to be arranged at the opposite sides next to the side edges 3, 5 of the collector element 1. In the embodiment of FIGS. 9 and 10 the collector element 1 to be installed is moved sideways to the direction where the second side ridge 5 of the collector element to be installed faces to. The second pocket 32 of the second fastener 28 is arranged to receive the second projecting element 21 of the collector element 1 and the second pocket 22 of the collector element 1 is arranged to receive the second projecting element 31 of the second fastener 28. When the second side ridge 5 of the collector element 1 is to be fastened to the second fastener 28, the flank 5a of the second side ridge 5 of the collector element 1 is arranged below the second flank 3b of the first side ridge 3 of the collector element 1 already fastened to the second fastener 28 at the opposite side thereof. This may be achieved by somewhat tilting the collector element 1 in respect of the second fastener 28 shown on the right hand side of FIGS. 9 and 10. When the second side ridge 5 of the collector element 1 to be installed in on the right position, the second flank 3b of the first side ridge 3 of the collector element 1 already in place is supported against the flank 5a of the second side ridge 5 of the collector element 1 to be installed in its place, as shown on the right hand side of FIGS. 9 and 10.

When the first side ridge 3 of the collector element 1 is installed in its place in respect of the second fastener 28 on the left hand side in the FIGS. 9 and 10, the first projecting element 19 in the collector element 1 is brought into contact with the first projecting element 29 of the fastener 28 from above the fastener 28. Thereafter the collector element 1 is pushed downwards, whereby the structure of the collector element 1 allows the collector element 1 to bend somewhat at the depression 4 and the first projecting element 19 at the collector element 1 passes by the first projecting element 29 in the fastener 28, whereby the first pocket 30 of the second fastener 28 is arranged to receive the first projecting element 19 of the collector element 1 and the first pocket 20 of the collector element 1 is arranged to receive the first projecting element 29 of the second fastener 28.

According to an embodiment of the collector element 1, at least part of the upper surface 1U of the collector element 1 is covered by with a layer 34 of photovoltaic material which is able to transform the solar energy straight to the electric energy. The layer 34 of photovoltaic material is shown schematically in FIG. 10 and it may comprise one or more photovoltaic cells. The means for transferring the electric energy generated by the photovoltaic material is not shown in FIG. 10 but they are generally known for a person skilled in the art.

When the solar radiation is received by the photovoltaic material, the photovoltaic material generates electric energy. At the same time the photovoltaic material tends to heat but the heat now conducts to the material of the collector element 1 and eventually to the heat transfer medium flowing in the flow channel 9 for the heat transfer medium in the collector element 1. This cools down the temperature of the photovoltaic material which increases its efficiency, which typically tends to decrease when the temperature increases. The collector element 1 may thus produce electric energy and heat energy at the same time. The flow of the heat transfer medium to cool down the temperature of the collector element may also be used in connection with other kind of collector elements, i.e. also with collector elements intended to transform the solar energy straight to electric energy.

Figure 11:
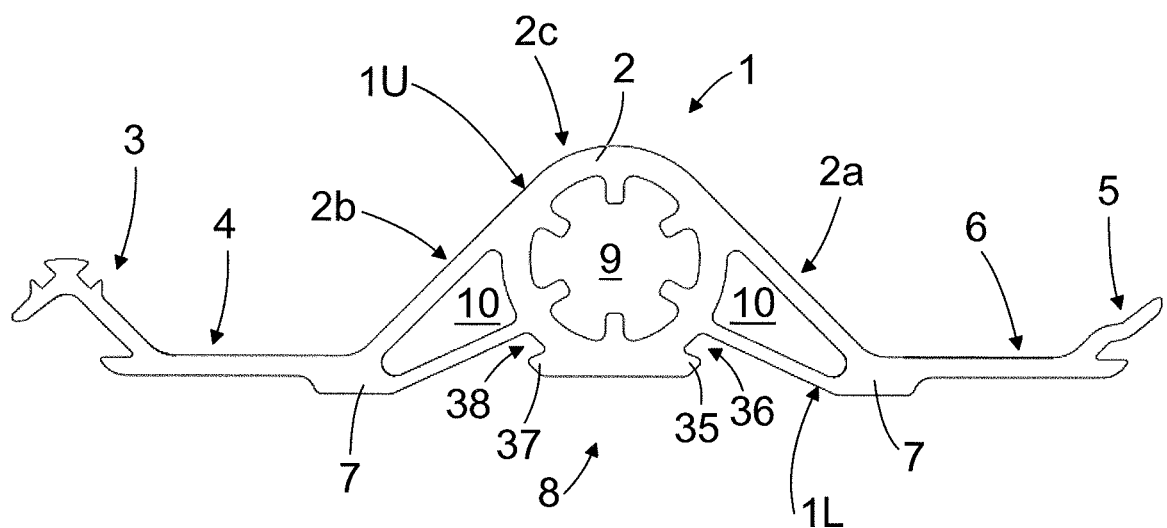
FIG. 11 shows schematically an end view of a third collector element.

FIG. 11 shows schematically an end view of a third collector element 1. The third collector element 1 is substantially similar to that one shown in FIG. 1 but further comprises at the lower surface 1L or the lower side 1L of the collector element 1 at the central ridge 2 means for enabling the fastening of the collector element 1 to its intended place of use. The collector element 1 of FIG. 11 comprises at the lower surface 1L of the central ridge 2 a third projecting element 35 extending towards the first flank 2a of the central ridge 2 whereby a third pocket 36 is arranged to form between the first flank 2a of the central ridge 2 and the third projecting element 35. Furthermore the collector element 1 comprises a fourth projecting element 37 extending towards the second flank 2b of the central ridge 2 whereby a fourth pocket 38 is arranged to form between the second flank 2b of the central ridge 2 and the fourth projecting element 38.

The structure of the collector element 1 of FIG. 11 allows it to be fastened at the lower part of the central ridge 2 to a fastener, which comprises pockets suitable to receive the third 35 and fourth 37 projecting elements and projecting elements suitable to extend into free spaces provided by the third pocket 36 and the fourth pocket 38. One or more fasteners like that may be fastened for example to roof trusses or to roof battens and the collector element 1 may be slid into its place in the collector element 1 through the end of the fastener.

It will be obvious to a person skilled in the art that, as the technology advances, the inventive concept can be implemented in various ways. The invention and its embodiments are not limited to the examples described above but may vary within the scope of the claims.

The invention claimed is:
1. A collector element for collecting solar energy, the collector element being made of metal and comprising:

at least one elongated central ridge comprising at least one internal flow channel for a heat transfer medium, first and second elongated side ridges at opposite sides of the at least one central ridge, the first and second side ridges being substantially parallel to the at least one central ridge and forming side edges of the collector element, and an elongated depression between each two adjacent ridges, and wherein a first flank of the first side ridge comprises a first fastening groove extending along the first flank of the first side ridge substantially parallel to the first side ridge and a second flank of the first side ridge comprises a second fastening groove extending along the second flank of the first side ridge substantially parallel to the first side ridge, whereby at least one substantially solar radiation permeable covering element for covering at least the at least one elongated central ridge of the collector element is to be fastened between the first fastening groove in the first flank of the first side ridge in one collector element and the second fastening groove in the second flank of the first side ridge in an adjacent collector element, and wherein the first side ridge comprises at a peak portion thereof a first elongated protrusion extending along the peak portion of the first side ridge and protruding away from the peak portion of the first side ridge, wherein the first flank of the first side ridge comprises at a distance from the peak portion a second elongated protrusion extending along the first flank and protruding away from the first flank, whereby the first elongated protrusion at the peak portion of the first side ridge and the second elongated protrusion at the first flank of the first side ridge define the first fastening groove extending along the first flank of the first side ridge for receiving a first side edge of the at least one covering element to be fastened between two adjacent collector elements, and wherein the second flank of the first side ridge comprises at a distance from the peak portion a third elongated protrusion extending along the second flank and protruding away from the second flank, whereby the first elongated protrusion at the peak portion of the first side ridge and the third elongated protrusion at the second flank of the first side ridge define the second fastening groove extending along the second flank of the first side ridge for receiving a second side edge of the at least one covering element to be fastened between two adjacent collector elements.

2. A collector element as claimed in claim 1, wherein the first flank on the side of the first side ridge faces to the at least one central ridge and the second flank on the side of the first side ridge faces away from the at least one central ridge, and the second side ridge comprises a flank on the side of the second side ridge facing to the at least one central ridge, whereby, when assembling a number of collector elements adjacently to each other the second flank of the first side ridge in one collector element is arranged to be at least partly positioned on top of the flank in the second side ridge of the adjacent collector element.

3. A collector element as claimed in claim 1, wherein the at least one substantially solar radiation permeable covering element is to be fastened between the first fastening groove in the first flank of the first side ridge of one collector element and the second fastening groove in the second flank of the first side ridge in an adjacent collector element.

4. A collector element as claimed in claim 1, wherein the collector element comprises a layer of photovoltaic material at least at a portion of an upper surface of the collector element to be arranged to face the sun.

5. A solar collector for collecting solar energy, the solar collector comprising
 at least one collector element as claimed in claim 1 and
 at least one substantially solar radiation permeable covering element to be fastened to the at least one collector element for covering at least the at least one elongated central ridge of the collector element.

6. A solar collector as claimed in claim 5, wherein the substantially solar radiation permeable covering element has a generally convex cross sectional shape so as to provide a free space between the collector element and the covering element.

7. A building comprising a roof, the roof comprising at least one solar collector as claimed in claim 5.

8. A method for transferring heat from at least one collector element collecting solar radiation, wherein the at least one collector element collecting solar energy is made of metal and includes:
 at least one elongated central ridge comprising at least one internal flow channel for a heat transfer medium,
 first and second elongated side ridges at opposite sides of the at least one central ridge, the first and second side ridges being substantially parallel to the at least one central ridge and forming side edges of the collector element, and
 an elongated depression between each two adjacent ridges, and
 wherein a first flank of the first side ridge comprises a first fastening groove extending along the first flank of the first side ridge substantially parallel to the first side ridge and a second flank of the first side ridge comprises a second fastening groove extending along the second flank of the first side ridge substantially parallel to the first side ridge, whereby at least one substantially solar radiation permeable covering element for covering at least the at least one elongated central ridge of the collector element is to be fastened between the first fastening groove in the first flank of the first side ridge in one collector element and the second fastening groove in the second flank of the first side ridge in an adjacent collector element, and
 wherein the first side ridge comprises at a peak portion thereof a first elongated protrusion extending along the peak portion of the first side ridge and protruding away from the peak portion of the first side ridge,
 wherein the first flank of the first side ridge comprises at a distance from the peak portion a second elongated protrusion extending along the first flank and protruding away from the first flank, whereby the first elongated protrusion at the peak portion of the first side ridge and the second elongated protrusion at the first flank of the first side ridge define the first fastening groove extending along the first flank of the first side ridge for receiving a first side edge of the at least one covering element to be fastened between two adjacent collector elements, and
 wherein the second flank of the first side ridge comprises at a distance from the peak portion a third elongated protrusion extending along the second flank and protruding away from the second flank, whereby the first elongated protrusion at the peak portion of the first side ridge and the third elongated protrusion at the second flank of the first side ridge define the second fastening groove extending along the second flank of the first side ridge for receiving a second side edge of the at least one covering element to be fastened between two adjacent collector elements,
 in which method heat transfer medium is arranged to be circulated through at least one heat transfer medium flow channel arranged in connection with the at least one collector element for transferring heat away from the collector element so as to cool down the collector element.

9. A collector element as claimed in claim 1, wherein convex surfaces of the elongated central ridge are arranged to receive solar energy.

* * * * *